United States Patent [19]

Kim et al.

[11] Patent Number: 5,263,233
[45] Date of Patent: Nov. 23, 1993

[54] METHOD AND APPARATUS FOR FLOCKING AN ARTICLE AND THE ARTICLE PRODUCED THEREBY

[76] Inventors: John C. Kim; John C. Kim, II, both of 38353 Abruzzi Dr., Westland, Mich. 48185

[21] Appl. No.: 791,072

[22] Filed: Nov. 12, 1991

[51] Int. Cl.$^5$ ............................................. A44B 21/00
[52] U.S. Cl. ..................................... 24/295; 24/289; 428/444
[58] Field of Search ................ 24/295, 293, 296, 289; 427/25, 33, 444

[56] References Cited

U.S. PATENT DOCUMENTS

| | | | |
|---|---|---|---|
| 2,147,779 | 2/1939 | Van Uum | 24/295 |
| 3,703,747 | 11/1972 | Hamman | 24/289 |
| 3,888,207 | 6/1975 | Stutz et al. | 427/25 |
| 3,935,370 | 1/1976 | Marti | 427/444 |
| 4,074,465 | 2/1978 | Bright | 24/289 |
| 4,630,338 | 12/1986 | Osterland et al. | 24/295 |
| 4,745,666 | 5/1988 | Murphy | 24/295 |

FOREIGN PATENT DOCUMENTS 0947815 1/1964 United Kingdom ................ 24/295

*Primary Examiner*—Victor N. Sakran
*Attorney, Agent, or Firm*—Charles W. Chandler

[57] ABSTRACT

An apparatus and an electrostatic process employing the apparatus which is capable of flocking spring clips of the type used in commercial applications, such as those used in the automotive industry to attach an instrument panel to an interior support structure. The apparatus and process are capable of securely adhering the flocking fibers uniformly over the irregular surfaces of a spring clip such that the spring clip can be more readily assembled while also acting to significantly dampen the vibration between the members joined by the clip. In addition, the apparatus also provides the added feature of requiring minimal space by introducing the fibers at a single point on the perimeter of the apparatus. The fibers are guided by the perimeter of the apparatus until a sufficient electrostatic charge is imparted to attract the fibers to the spring clip.

9 Claims, 2 Drawing Sheets

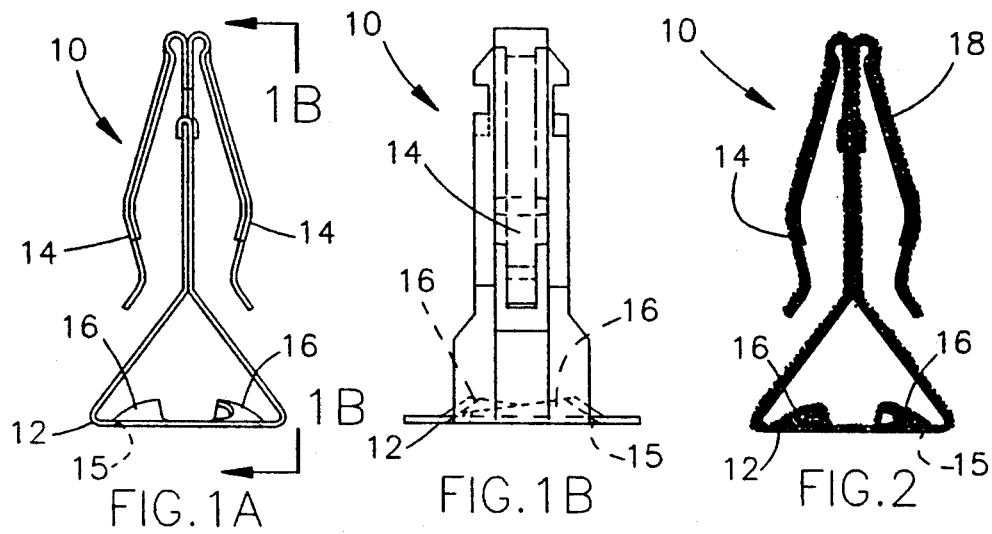
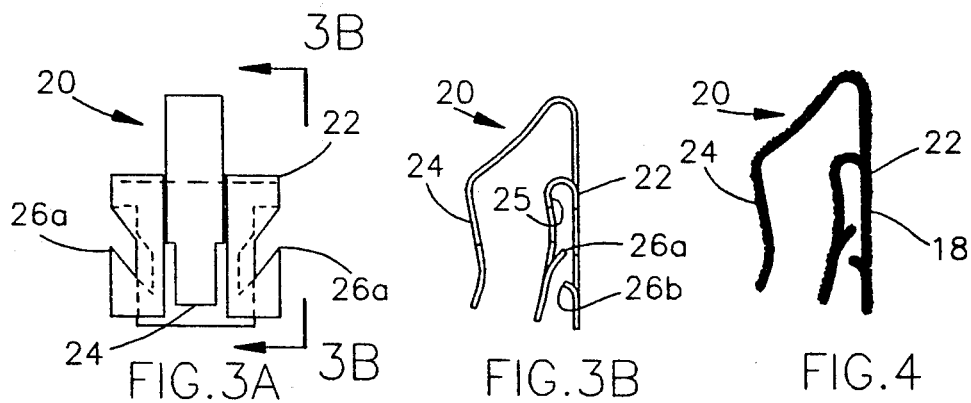
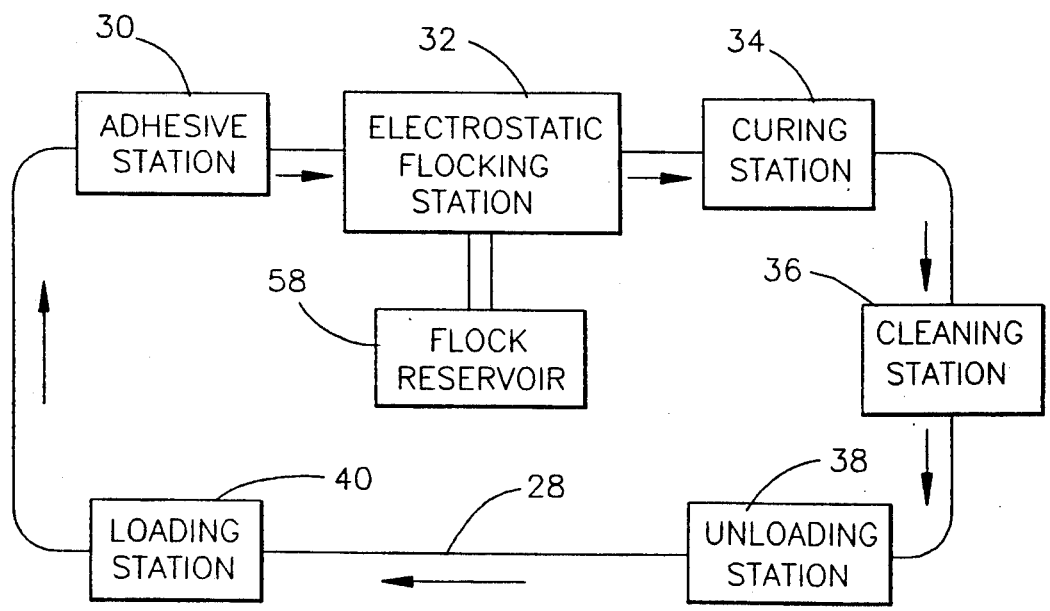
FIG. 5

METHOD AND APPARATUS FOR FLOCKING AN ARTICLE AND THE ARTICLE PRODUCED THEREBY

BACKGROUND OF THE INVENTION

1. Field of the Invention

The present invention generally relates to an apparatus for applying flocking fibers to an article. More specifically, this invention relates to an apparatus and a method carried out by the apparatus for bonding flocking fibers to intricate three dimensional articles, such as metal clips used to join two or more objects, in which the adhesive strength between the flocking fibers and the article is sufficient for automotive use.

2. Description of the Prior Art

Various forms of clips are widely known in the fastener art, with the primary common feature being the ease by which the clip can be installed to assemble two or more objects without the need for additional cooperating components. In their most common form, clips are of the spring clip type which are self-retaining, one-piece fasteners having a spring feature for resiliently engaging a mounting hole or flange. Spring tension created between the spring feature and the mounting hole or flange secures the clip and enables the clip to resist loosening due to vibration.

Spring clips are often preferred where cost and quick assembly is of primary importance. In the case of a spring clip which engages a mounting hole, spring clips are particularly attractive where disassembly is rarely or never required. A common example of such an application is where a panel is to be secured to a frame, such as an automotive instrument panel which is mounted to the interior of an automobile. The spring clip is typically attached to the inner surface of the panel, and then forcibly inserted into a mounting hole provided in the support structure for the panel. The support structure will generally be a relatively thin but rigid member such that the mounting hole is a through hole with minimal depth. Once the clip is inserted into the mounting hole, the spring feature, which is often one or more cantilevered members projecting from the main body of the clip, engages the opposite surface of the mounting structure to retain the panel to the structure.

While clips have been widely accepted in such automotive applications, two related problems have generally been encountered. The first is the tendency for a clip to result in a somewhat loose assembly, the spring tension provided by the spring feature being insufficient to secure the panel tightly to the support structure. This is due in part to the second encountered problem, that being the need to provide sufficient clearance between the clip and its mounting hole to allow for assembly with minimal effort. As the ease of installation increases, there is typically a corresponding decrease in the clip's ability to tightly secure the panel to the support structure. Associated with this deficiency is the noise produced between the panel, the clip and the support structure when the assembly is subjected to vibration. In contrast, where a clip fits sufficiently tight within the mounting hole to minimize noise due to vibration, there is a corresponding increase in the difficulty in which the clip is inserted into the mounting hole. Consequently, under high volume, mass production conditions there arises a significant increase in deformed and damaged clips.

As a solution, the prior art has applied flocking technology to ease the assembly of the clip into its corresponding hole while maintaining a close fit therebetween. Generally, a flocking process entails the bonding of numerous short fibers to a surface such that each fiber projects substantially perpendicular from the surface. Common fiber materials include textile fibers, such as cotton, and synthetics, such as polyesters, depending upon the environment in which the flocking is intended to perform. As applied to a spring clip, the flocking fibers act to ease the assembly of the spring clip with the mounting hole in the support structure, while also acting to dampen vibration between the panel and the mounting hole to reduce noise.

Numerous examples of flocking apparatuses and processes, along with uses for flocking fibers, are taught in the art. Examples of flocking apparatuses include U.S. Pat. No. 4,146,177 to Jordan et al U.S Pat. No. 4,420,360 to Batisse, U.S. Pat. No. 4,879,969 to Haranoya et al, and U.S. Pat. No. 4,963,392 to Molnar et al. Each apparatus has as its primary object the ability to efficiently and broadly distribute the flocking material over the target surface. Consequently, the apparatuses of the prior art generally require space sufficient to allow the flocking fibers to disperse during the flocking process. Each apparatus also provides a method for electrostatically charging the flocking fibers and the target surface prior to introducing the fibers to the target. The fibers and the target surface are oppositely charged such that fibers are attracted to the target, where they adhere to an adhesive previously applied to the target surface. Though often noted that the flocking material need not be electrostatically attracted to the target surface, this processing method is generally preferred, as can be seen by the above-noted patents.

The prior art teaches that articles of various materials can be flocked using the electrostatic method, as seen by U.S. Pat. No. 5,047,103 to Abrams et al, U.S. Pat. No. 4,746,546 to Bachmann et al, and Batisse, which teach the flocking of cloth fabrics, plastics, and metals, respectively. Moreover, the electrostatic method is adaptable for flocking articles of various sizes and shapes, as suggested by U.S. Pat. No. 4,238,526 to Chitouras.

However, considerable difficulty has been encountered with attempts to flock intricate articles such as the spring clips described above. Because of the typically complicated forms which spring clips require, so as to provide a spring feature and a mounting feature by which the clip is attached to a panel, uniformity of the flocking material is difficult to attain. In addition, problems of adherence between the flocking fibers and the spring clip have also been encountered because of the sharp bends often formed in the clip. As a result, the art pertaining to spring clips presently employs pliant strips of cloth or plastic to which the flocking fibers are first adhered. The strips are then cut to size and adhered to the surfaces of the clips where friction can be reduced to improve assembly ease and where dampening can be achieved. This approach is obviously time consuming and labor intensive, resulting in unacceptably high processing and piece part costs.

Therefore, what is needed is a flocking apparatus, and a process thereby, which can uniformly apply flocking fibers to a spring clip such that the processing costs and time are minimized, and which enables the flocking fibers to be directly adhered to the spring clip to produce a flocked spring clip that is suitable for use in commercial production applications.

SUMMARY OF THE INVENTION

The present invention provides an apparatus and a process employing the apparatus which is capable of flocking spring clips of the type used in commercial applications, such as those used in the automotive industry to attach an instrument panel to an interior support structure. In addition, this invention provides such a flocked spring clip. Of primary importance, the apparatus and process of the present invention are capable of securely adhering the flocking fibers uniformly over the irregular surfaces of a spring clip such that the spring clip provides easier assembly while also significantly dampening vibration between the panel and its support structure. In addition, the apparatus also provides the added feature of requiring significantly less space than that of the prior art.

In particular, the apparatus of the present invention consists of a chamber which is substantially cylindrical in shape with an internal passage having a circular, and preferably elliptical, cross-section. Due to the method in which the flocking fibers are introduced into the chamber, the chamber need not be especially large in either diameter or length. Both axial ends of the chamber are open to provide an entrance and exit for the spring clips to be flocked. The interior surface of the chamber is charged either positively or negatively, while the spring clip is charged opposite to the chamber wall to create an electrical potential between the two.

The flocking fibers are introduced into the chamber in a direction substantially tangential to the interior perimeter of the chamber. In this manner, the fibers are introduced at a sufficient velocity such that they follow the contour of the elliptical cross-section of the passage so as to revolve around the spring clip within. As the fibers follow the perimeter of the passage, they gradually pick up a sufficient charge from the perimeter until they are repelled from the wall of the passage and are attracted towards the oppositely-charged spring clip. In leaving the charging influence of the passage wall, each fiber becomes polarized with one end forming the positive pole while the other forms the negative pole. The end of the fiber charged oppositely to the spring clip is attracted to the spring clip while the opposite end of the fiber is repelled, resulting in each fiber being electromagnetically attached perpendicularly to the surface of the spring clip.

In the preferred embodiment of the present invention, the flocking chamber is employed within a flocking process that includes a station which applies an adhesive to the spring clip, a curing station which cures the adhesive once the flocking fibers are introduced to the spring clip, and a cleaning station by which loose flocking fibers are removed. Preferably, the spring clips are transported between each station on a continuous conveyor device to allow continuous production of flocked clips.

Finally, the conveyor device can be provided with fixturing which secures the spring clips individually to the conveyor. The fixturing performs a secondary function in that specific regions of a spring clip can be masked from coverage by the adhesive and the flocking fibers. As a result, critical surface areas of a spring clip which must be free of fibers to perform properly can be provided. The remaining surface area of the spring clip is uniformly covered with the flocking fibers whose density can be controlled by both the specific rate at which the fibers are introduced into the chamber and by the charge potential imposed between the chamber and the spring clip. The adhesive used to permanently bond the flocking fibers to the spring clip is particularly selected for its ability to bond the fibers to the metal surface of the spring clips.

Accordingly, an advantage to the apparatus of the present invention is that the flocking chamber is economically sized, needing only to be large enough to accommodate the spring clips and the single-point introduction of the flocking fibers. Thus, the apparatus does not need to be sized to provide a uniform dispersal of flocking fibers which are directed towards the spring clip, which is effectively immersed in a cloud of fibers. What is produced is a flocked spring clip that is suitable for use in commercial production applications, having a uniform covering of flocking fibers applied to the critical surface areas of the spring clip. Moreover, the flocking process carried out by the apparatus minimizes processing costs and time, enabling the flocking fibers to be adhered directly to the spring clip.

Another advantage of the present invention is that the flocking apparatus is adapted to operate within a highly automated system in which the spring clips move along a conveyor between successive treatments until the final flocked version of the spring clip is produced. Moreover, the spring clip produced by the process of the present invention is uniformly coated with the fibers, even where the spring clip form is extremely contorted to create the desired biasing effect necessary to retain the spring clip in position.

Accordingly, it is an object of the present invention to provide an apparatus for flocking an article in a uniform manner. The present invention accomplishes this object by providing a flocking chamber having an interior perimeter which serves to channel the flow of the flocking fibers within the chamber, while also serving to charge the fibers until sufficient charge is accumulated to attract the fibers towards the article to be flocked.

It is a further object of this invention to provide an apparatus which is suitable for high-volume processing by limiting the introduction of the flocking fibers to a single point source, thereby reducing the space required to accommodate the apparatus while also eliminating the practice of flocking the article through the previous methods of broadly dispersing the flocking fibers around the article.

It is still a further object of this invention to provide a processing method which automates the flocking process by transporting the article to be flocked with a conveyor device which continuously transports the article to be flocked through preparation, curing and cleaning stages.

It is yet a further object of this invention to provide a processing method which employs the apparatus of the present invention.

It is still another object of this invention to provide an apparatus and processing method which is capable of producing a flocked spring clip especially suitable for automotive applications, such that the spring clip's ease of assembly is improved while also providing a dampening feature which acts to subdue noise due to vibration.

Other objects and advantages of this invention will be more apparent after a reading of the following detailed description taken in conjunction with the drawings provided.

BRIEF DESCRIPTION OF THE DRAWINGS

The description refers to the accompanying drawings in which like reference characters refer to like parts throughout the several views, and in which:

FIG. 1A is a frontal view of one type of spring clip prior to undergoing the flocking process of the present invention;

FIG. 1B is a side view of the spring clip of FIG. 1A;

FIG. 2 is a frontal view of the spring clip of FIGS. 1A and 1B after undergoing the flocking process according to a preferred embodiment of the present invention;

FIG. 3A is a frontal view of a second type of spring clip prior to undergoing the flocking process of the present invention;

FIG. 3B is a side view of the spring clip of FIG. 3A;

FIG. 4 is a side view of the spring clip of FIGS. 3A and 3B after undergoing the flocking process according to a preferred embodiment of the present invention;

FIG. 5 is a schematic representation of the preferred processing steps according to the preferred embodiment of the present invention;

DETAILED DESCRIPTION OF THE PREFERRED EMBODIMENT

Figure 6:
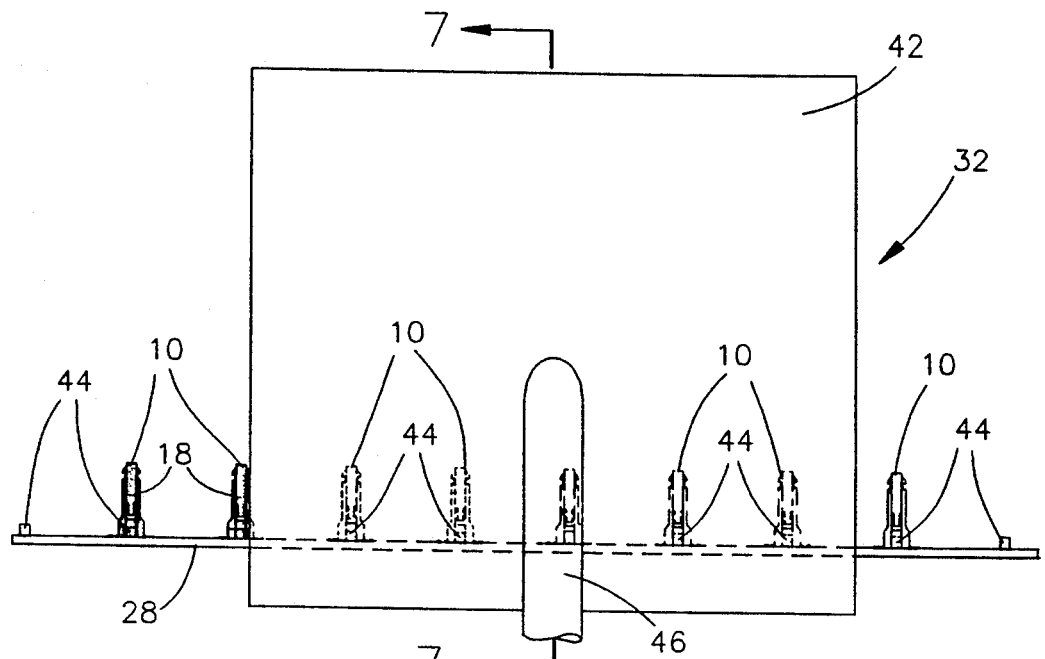
FIG. 6 is a frontal view of the flocking apparatus according to the preferred embodiment of the present invention.

Referring to FIGS. 1 through 4, there are shown two types of clips 10 and 20 which are particularly suitable for use in the automotive industry for fastening various objects together, such as an automobile's instrument panel (not shown) to an interior support structure (not shown). As illustrated, clips 10 and 20 are of the spring clip type which are self-retaining, one-piece fasteners having a spring feature for resiliently engaging a mounting hole or flange (not shown). In addition to providing savings in cost and assembly time over traditional fasteners such as screws and bolts, clips 10 and 20 are also preferred where repeated disassembly is not expected, such as with an automobile's instrument panel, to which reference will be made throughout this description to illustrate the present invention. Moreover, the spring tension created between the spring feature and the mounting hole or flange also provides resistance to release of clip 10 and 20 from its mounting hole due to vehicle vibration.

Generally, clips 10 and 20 can be formed from any suitable material which provides sufficient strength and stiffness for the task performed. While plastic clips have found wide use in many applications, metal clips, and more preferably spring steel clips, are most preferred within the automotive industry for their ability to withstand corrosion while also being largely immune to creep and memory loss over time while under stress. Accordingly, the present invention is directed to a flocking process that is specifically adapted to clips 10 and 20 formed from spring steel such as SAE 1050 or 1060, and more specifically, a spring steel coated with phosphate for corrosion inhibition.

As illustrated, each clip 10 and 20 comprises a base feature 12 and 22, respectively, and one or more spring members 14 and 24, respectively. Typically, bases 12 and 22 can be secured to the panel to the support frame by any suitable means. As an example, clip 10 employs a pair of helical flanges 15 formed with an aperture 15. Helical flanges 15 threadably engage a male fastener (not shown) extending from the interior surface of the instrument panel. Alternatively, a cooperating pair of locking projections 26 extending into a slot 25 formed by base 22 of clip 20 can be engaged with an edge of the panel to retain clip 20 to the panel.

To secure the instrument panel to the support structure, the panel is positioned such that clip 10 or 20 will engage the mounting hole in the support structure. The mounting hole is sized to create an interference fit with spring members 14 or 24 when spring clip 10 or 20 is inserted into the mounting hole. Once inserted, spring members 14 and 24 resiliently expand to positively engage the mounting hole, thereby preventing clip 10 or 20 from being removed from the mounting hole without the application of significant force.

As illustrated in FIGS. 2 and 4, clips 10 and 20 are flocked using the apparatus and method of the present invention to reduce friction between spring members 14 and 24 and the mounting hole. Accordingly, spring members 14 and 24 are each illustrated as being uniformly covered with flocking fibers 18. Flocking fibers 18 are usually in the form of short fibers made from a material which will withstand the environment within which the clips 10 and 20 are required to function. While fibers 18 formed from cotton and various synthetics have been used, the present invention is more specifically directed to the use of nylon fibers, and more preferably nylon fibers having a fineness of about 1.5 to 18 deniers, with a preferred range being between about 3 to 6 deniers. In practice, a blend in which 70% of fibers 18 are roughly 6 deniers while 30% are roughly 3 deniers has proven satisfactory. However, the preferred size of fibers 18 and/or range of sizes will vary according to the particular application. The preferred length of fibers 18 is approximately 0.04 to 0.05 inches, and more preferably 0.045 inches. Practically, the length of the fiber may vary from about 0.01 inches to about 0.1 inches, depending on the intended application. This is true for the fineness of the fiber also. Nylon is preferred for the purposes of wear resistance between clips 10 and 20 and the mounting hole so as to maintain the clips' ability to dampen noise due to vibration. Such nylon fibers have been tested to an equivalent of 100,000 miles of automobile life with good results.

For purposes of flocking spring steel clips 10 and 20 with nylon flocking fibers 18, it has been determined that the adhesive used to bond fibers 18 to clips 10 and 20 is a primary factor in the performance and life of clips 10 and 20. This is particularly true in view of the intricate and complex shapes which the clips 10 and 20 assume in order to form bases 12 and 22 and spring members 14 and 24, as illustrated in FIGS. 1 through 4. Testing has indicated that an epoxy resin is most suited for adhering fibers 18 to clips 10 and 20. More specifically, a temperature-sensitive epoxy resin adhesive applied as a solvent mixture to a thickness which produces a cured thickness of approximately 1/10 that of the chosen length of fibers 18 has been found most suitable. Accordingly, with the above-noted preferred length of 0.04 inches, the after-cure thickness of the adhesive will be approximately 0.004 inches. Moreover, the post-cure thickness of the adhesive is affected by the relative amounts of solids within the adhesive, with greater amounts of solids resulting in a lower loss of thickness during the cure. However, it should be noted that the thickness of the epoxy may vary greatly from about 0.001 inches to about 0.01 inches, depending on the particular epoxy and properties required of the finished flocked clip.

According to a preferred method of the present invention, the adhesive is applied as a spray as a means of automating the process. During a subsequent 20 minute cure at approximately 300° F., the solvent is forced to evaporate, leaving the epoxy adhesive to bond fibers 18 to the exterior surfaces of clips 10 and 20. Such an adhesive is available from the Nyatex Chemical Company of Howell, Mich., under the code number 60F1071, which is applied in conjunction with a corresponding curing agent 65F1072.

With reference now to FIG. 5, there is shown in a schematic representation the preferred processing steps of the present invention. The particular processing steps include the application of the adhesive on clips 10 and 20 at an adhesive station 30, the flocking of clips 10 and 20 with fibers 18 at a flocking station 32, the curing of the adhesive at a curing station 34, and the removal of excess flocking fibers 18 at a cleaning station 36. As noted above, adhesive station 30 preferably applies the adhesive to clips 10 and 20 as a spray, whose methods are well known in the art and will not be discussed here. Prior to applying the adhesive, it is preferable to remove all oils and other miscellaneous contaminants from clips 10 and 20 by any conventional cleaning method known to the art, so as to ensure suitable coverage and performance by the adhesive.

In order to properly deposit and adhere fibers 18 to clips 10 and 20, fibers 18 must be drawn to clips 10 and 20 in a manner that orients fibers 18 to be substantially perpendicular to the surfaces of clips 10 and 20 upon which the adhesive is applied. The preferred method of drawing fibers 8 to clips 10 and 20 is through the electrostatic method previously described, wherein an electrical potential is created between fibers 18 and clips 10 and 20. In practice, a potential between 0 and approximately 90,000 volts has proven highly successful. Fibers 18 are influenced to take on a positive or negative charge, while clips 10 and 20 are charged oppositely. The charging process allows fibers 18 to be drawn to clips 10 and 20, after which the previously applied adhesive acts to permanently bond fibers 18 to the clips' surface.

A conveyor device 28 is indicated to run between each of the processing steps 30 through 36 to continuously transport a supply of clips 10 and 20, with rates of up to 24,000 parts per hour being achieved in practice. A suitable conveyor for purposes of the present invention is an electrically conductive belt, for purposes to be described more fully below. Also indicated in FIG. 5 are loading and unloading stations 40 and 48, respectively, at which clips 10 and 20 can be respectively placed on and removed from conveyor 28. Finally, a reservoir 58 from which a supply of fibers 18 is held for transferring to flocking station 32 is also indicated in the schematic of FIG. 5. Methods for transferring fibers 18 to flocking station 32 are well known in the art, such as through the use of pressurized air.

Figure 7:
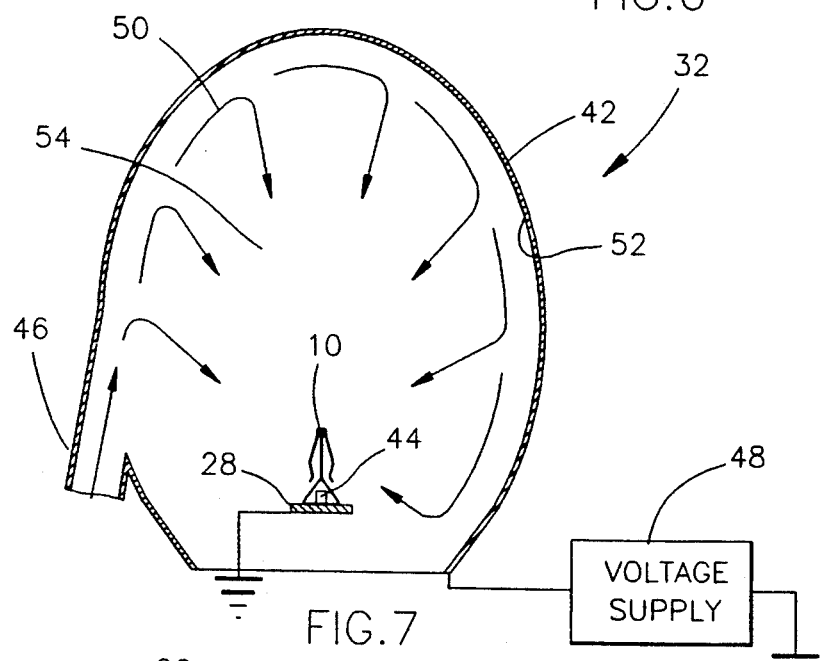
FIG. 7 is a cross-sectional view of the flocking apparatus of FIG. 6 taken along line 7—7.

FIGS. 6 and 7 illustrate the preferred flocking apparatus 42 of the present invention. Flocking apparatus 42 is generally cylindrical, having a preferred length of approximately 36 inches, a preferred width of approximately 24 inches and a preferred height of approximately 30 inches, although the dimensions may vary depending on the application. A supply tube 46 is attached to flocking apparatus 42 through which fibers 18 are transported from flock reservoir 58 and by which fibers 18 are introduced at a single point source into flocking apparatus 42. As best seen in FIG. 7, there is an axial passage 54 formed in flocking apparatus 42 through which clips 10 and 20 are transported upon conveyor 28. The perimeter of passage 54 is preferably elliptical in cross-section as defined by the interior surface 52 of passage 54. Tube 46 is oriented to be nearly tangential to interior surface 52 of passage 54 such that, as fibers 18 enter passage 54 from tube 46, they follow interior surface 52 as indicated by reference number 50 in FIG. 7. Accordingly, fibers 18 are not broadly distributed throughout passage 54 but remain concentrated along a path defined by interior surface 52 of passage 54 which includes the entrance of tube 46 into passage 54. Consequently, flocking apparatus 42 need not be so large as to accommodate a dispersal pattern for fibers 18, as noted with the prior art.

The manner in which fibers 18 enter passage 54 is useful in that it creates an opportunity by which a charge can be attributed to fibers 18 by their contact with interior surface 52 of passage 54. A voltage supply 48 is used to impart a potential of up to 90,000 volts between interior surface 52 and clips 10 and 20. For this purpose, conveyor 28 must be electrically conductive to transfer a charge from voltage supply 48 to clips 10 and 20. Accordingly, as fibers 18 follow along interior surface 52, they gradually become charged until there is a sufficient attraction between fibers 18 and clips 10 and 20 to overcome the momentum of individual fibers 18.

The voltage selected for flocking apparatus 42 is chosen in part in response to variations in the moisture content of fibers 18 used. A lower moisture content in fibers 18 requires a higher electrical potential to induce sufficient charges in fibers 18. The voltage used also affects the practical density at which fibers 18 can be applied to clips 10 and 20, and consequently, the rate at which fibers 18 are introduced into flocking apparatus 42.

As fibers 18 leave interior surface 52, each fiber 18 becomes polarized, with a negative charge migrating to one end and resulting in a positive charge being created at the other. Consequently, the ends of fibers 18 having a charge opposite to that of clips 10 and 20 are attracted to clips 10 and 20 while the opposite end is repelled, forcing fibers 18 to be oriented substantially perpendicular to the surface of clips 10 and 20. Once in contact with the adhesive disposed upon clips 10 and 20, fibers 18 are securely held as the clips 10 and 20 leave flocking apparatus 42 and enter curing station 34, where the adhesive is set.

Figure 8:
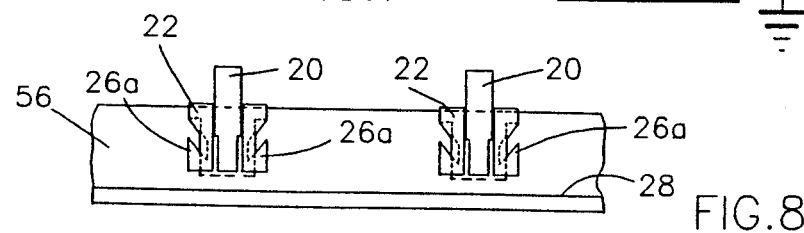
FIG. 8 is a side view of the spring clip of FIGS. 3A through 4 as shown fixtured for processing according to a preferred embodiment of the present invention.

As shown in FIGS. 6 and 7, clip 10 is fixtured to conveyor 28 with a suitable mounting stud 44 which approximates the previously noted threaded member with which aperture 15 is intended to mate. As shown in FIG. 8, a mounting strip 56 is provided by which for clip 20 can be fixtured to conveyor 28. Mounting studs 44 and mounting strip 56 can be advantageously designed to mask portions of clips 10 and 20 which are to be preferably free of fibers 18. As an example, the area surrounding locking projections 26 and the interior surface of slot 25 of clip 20 would preferably not be flocked to ensure that clip 20 will be securely retained onto the edge of the panel. Correspondingly, aperture 15 of clip 10 is preferably free of fibers 18 for the same reason. Also note that the masking of clips 10 and 20 prevents the adhesive from being applied to these areas.

In operation, clips 10 and 20 are mounted to their corresponding fixtures, mounting studs 44 and mounting strip 56, on conveyor 28 at loading station 40. Conveyor 28 is then set in motion to transport clips 10 and 20 first to adhesive station 30 where the adhesive is applied to the exposed surfaces of clips 10 and 20. As previously noted, the adhesive is sprayed to a depth of preferably about 0.004 inches. Thereafter, clips 10 and 20 are transported on conveyor 28 to flocking station 32, consisting of flocking apparatus 42. Clips 10 and 20 are transported through passage 54, where fibers 18 are introduced into passage 54 by tube 46. Fibers 18 follow interior surface 52 of passage 54 until sufficient charge is transferred to fibers 18 to draw fibers 18 from interior surface 52 of flocking apparatus 42 to clips 10 and 20. Fibers 18 are introduced at a sufficient rate to uniformly coat the exposed surfaces of clips 10 and 20, and orient themselves to be substantially perpendicular to the surfaces which they attach themselves through their electromagnetic charge. Once drawn to the surfaces of clips 10 and 20, fibers 18 are held there by the adhesive.

After leaving flocking apparatus 42, clips 10 and 20 continue to curing station 34 where the adhesive is cured to permanently retain fibers 18 to the surfaces of clips 10 and 20. The clips 10 and 20 are then transported to cleaning station 36 where any unattached fibers 18 or other foreign matter are removed. Finally, clips 10 and 20 are brought to unloading station 38 where they are removed and prepared for packaging.

An advantage to the present invention is that flocking apparatus 42 can be economically sized, needing only to accommodate clips 10 and 20 and the single-point introduction of fibers 18 through tube 46. Thus, flocking apparatus 42 does not need to be sized to allow for the uniform dispersal of fibers 18 as taught by the prior art. Flocking apparatus 42 is capable of flocking clips 10 and 20 of the type used in commercial applications, such as those used in the automotive industry to attach an instrument panel to an interior support structure. Of primary importance, flocking apparatus 42 is capable of securely adhering fibers 18 uniformly over the irregular surfaces of clip 10 and 20 such that clips 10 and 20 provide for easier assembly while also significantly dampening vibration between the panel and its support structure.

Another advantage of the present invention is that flocking apparatus 42 is adapted to operate within a highly automated system in which clips 10 and 20 are transported by conveyor 28 between successive processing stations 30 through 36. Moreover, clips 10 and 20 produced by the process of the present invention are uniformly coated with fibers 18, even on the highly irregular surfaces of clips 10 and 20. What results are flocked clips 10 and 20 having improved ease of installation without a corresponding loss in their ability to tightly secure the panel to the support structure. Moreover, clips 10 and 20 are able to dampen vibration between the panel, the clip and the support structure by which rattles and squeaks are produced. Consequently, clips 10 and 20 are highly suitable for mass production conditions, such as those in the automotive industry.

Finally, conveyor 28 can be provided with fixturing 44 and 56 by which clips 10 and 20 can be individually secured. In addition, fixturing 44 and 56 perform a secondary function in that portions of clips 10 and 20 can be masked from coverage by the adhesive and fibers 18.

Finally, the adhesive used to permanently bond fibers 18 to clips 10 and 20 is particularly selected for its ability to bond fibers 18 to the spring steel surfaces of clips 10 and 20.

While the invention has been described in terms of a preferred embodiment, it is apparent that other forms could be adopted by one skilled in the art. As an example, many different types of articles can be flocked according to the teachings of this invention. Accordingly, the scope of the invention is to be limited only by the following claims.

Having described my invention, I claim:

1. A clip for retaining a first object to a second object wherein the second object has a feature for engaging a clip, the clip comprising:
   a spring member;
   an adhesive applied to the spring member;
   flock material secured to the spring member with the adhesive;
   said clip having a hose being manufactured in accordance with the method comprising the steps of:
   applying an adhesive layer to a uniform depth completely covering the outside portion of the surface of the spring portion of said spring member;
   inserting the spring member into a flocking apparatus;
   electrically charging the flocking apparatus while oppositely charging the spring member; and
   introducing flocking fibers into the flocking apparatus so as to attribute an electrical charge to the fibers which is opposite to the electrical charge of the spring member;
   whereby the fibers are electrostatically applied to the surface of the spring member, the fibers thereafter being permanently secured to the spring member by the adhesive layer of sufficient thickness, and the flocking fibers reduce the friction between the spring member and said feature of the second object to facilitate assembly, and whereby the flocking fibers dampen vibration between the first object and the second object.

2. The clip of claim 1 further comprising a base member from which the spring member resiliently extends.

3. The clip of claim 1 wherein the flock material comprises nylon fibers having a length of about 0.04 to about 0.05 inches and a fineness from about 3 to about 6 deniers.

4. The clip of claim 1 wherein the clip is formed from spring steel.

5. The clip of claim 1 wherein the adhesive is an epoxy resin.

6. The clip of claim 1 wherein the adhesive is applied to a thickness of approximately one tenth the length of the flock materials.

7. The clip of claim 1 wherein the clip is spring steel clip for use in automotive applications in which a first object is secured to a second object wherein the second object has an opening for engaging the clip, the clip comprising:
   a base member;
   a spring member resiliently extending from the base member;
   an epoxy resin adhesive applied to the base member and the spring member; and
   flock fibers secured to the base member and the spring member with the adhesive;
   whereby the flock fibers reduce the friction between the clip and the opening in the second object to facilitate assembly, and whereby the flock fibers dampen vibration between the first object and the second object.

8. The clip of claim 7 wherein the flock fibers are nylon fibers having a length of approximately 0.045 inches and a fineness from about 3 to about 6 deniers.

9. The clip of claim 7 wherein the adhesive is applied to a thickness of approximately one tenth the length of the flock fibers.

* * * * *